United States Patent
Kondou

(10) Patent No.: US 7,427,646 B2
(45) Date of Patent: Sep. 23, 2008

(54) NATURAL RUBBER, RUBBER COMPOSITION AND PNEUMATIC TIRE

(75) Inventor: Hajime Kondou, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 185 days.

(21) Appl. No.: 10/509,034

(22) PCT Filed: Mar. 27, 2003

(86) PCT No.: PCT/JP03/03830

§ 371 (c)(1),
(2), (4) Date: Mar. 4, 2005

(87) PCT Pub. No.: WO03/082925

PCT Pub. Date: Oct. 9, 2003

(65) Prior Publication Data

US 2005/0148723 A1    Jul. 7, 2005

(30) Foreign Application Priority Data

Mar. 28, 2002  (JP) ............................ 2002-091327
Mar. 29, 2002  (JP) ............................ 2002-095386
Apr. 1, 2002   (JP) ............................ 2002-098901

(51) Int. Cl.
*C08K 3/00*  (2006.01)
*C08K 5/02*  (2006.01)

(52) U.S. Cl. .................................. 524/575.5; 152/450
(58) Field of Classification Search ............ 524/575.5; 152/450

See application file for complete search history.

(56) References Cited

U.S. PATENT DOCUMENTS 2,116,089 A    5/1938    Wallerstein
6,265,479 B1   7/2001    Ichikawa et al.

FOREIGN PATENT DOCUMENTS

| | | |
|---|---|---|
| CN | 1246485 | 3/2000 |
| EP | 0 805 163 A2 | 11/1997 |
| EP | 1 149 902 A | 10/2001 |
| EP | 1 489 102 A1 | 12/2004 |
| GB | 2 179 355 A | 3/1987 |
| JP | 2001-81107 A | 3/2001 |

*Primary Examiner*—Peter D Mulcahy
(74) *Attorney, Agent, or Firm*—Sughrue Mion, PLLC

(57) ABSTRACT

Natural rubber obtained by a deproteinizing treatment of a natural rubber latex and has a total nitrogen content adjusted in the range of 0.12 to 0.30% by weight and a rubber composition and a pneumatic tire using the natural rubber. The processability of natural rubber can be improved without adverse effects on the physical properties proper to natural rubber. The rubber composition exhibits an improved low hysteresis loss property and improved abrasion resistance and can be advantageously used for the tire case members and the tire tread of pneumatic tires.

19 Claims, No Drawings ized natural rubber having a total nitrogen content of 0.1% by weight or smaller is described. Recently, various technologies for deproteinization have been proposed in the field of special applications such as natural rubber products for medical applications. Natural rubber from which non-rubber components such as proteins have been removed to a great extent are known (Japanese Patent Application Laid-Open Nos. Heisei 8(1996)-143606, Heisei 11(1999)71408 and 2000-19801).

However, although the natural rubber from which proteins have been almost completely removed exhibits improved processability, rubber compositions using such conventional deproteinized natural rubber have drawbacks in that modulus of the rubber decreases, the resistance to aging is inferior and the low hysteresis loss property is adversely affected since non-rubber components exhibiting the effects of antioxidation and vulcanization acceleration have been almost completely removed.

Moreover, the conventional deproteinized rubber has a further drawback in that the physical properties of the rubber markedly deteriorate since non-rubber components other than proteins are also lost when proteins are removed from a latex by centrifugation.

On the other hand, as the method for improving abrasion resistance of a tread rubber of a pneumatic tire, in general, it has been conducted that carbon black having a smaller particle diameter and a higher structure is used so that the reinforcing property of carbon black is enhanced by increasing the interaction between carbon black and the polymer or that carbon black is used in a greater amount.

However, dispersion of carbon black is poor in conventional rubber compositions containing natural rubber and carbon black having a very small particle diameter (a specific surface area by nitrogen adsorption ($N_2SA$) of 80 $m^2/g$ or greater) and these compositions exhibit great viscosity and poor processability due to the poor dispersion. The physical properties such as abrasion resistance and the low hysteresis loss property (the low heat build-up property) are insufficient also due to the poor dispersion.

NATURAL RUBBER, RUBBER COMPOSITION AND PNEUMATIC TIRE

TECHNICAL FIELD

The present invention relates to a natural rubber, a rubber composition and a pneumatic tire. More particularly, the present invention relates to a natural rubber exhibiting remarkably improved processability, insufficient processability being a drawback of natural rubber, without adverse effects on the physical properties proper to natural rubber, a process for producing the natural rubber and a rubber composition and a pneumatic tire comprising the natural rubber.

BACKGROUND ART

In general, natural rubber is known as the rubber exhibiting excellent mechanical properties, low hysteresis loss property and abrasion resistance. However, the processability is inferior to that of synthetic rubbers. This drawback arises since entanglements between rubber molecules increase due to the polypeptide bonds in the proteins present in non-rubber components of natural rubber latex used as the raw material and the apparent molecular weight increases to a great extent to increase the Mooney viscosity of the rubber.

To improve the processability of natural rubber, for example, in Japanese Patent Application Laid-Open No. Heisei 6(1994)-329838, a highly deprotein- Dispersion of carbon black is poor in conventional rubber compositions containing natural rubber and carbon black having a low structure (a DBP absorption of 100 ml/100 g or smaller) and these compositions exhibit great viscosity and poor processability due to the poor dispersion. The physical properties such as abrasion resistance and the low hysteresis loss property (the low heat build-up property) are insufficient also due to the poor dispersion.

Rubber compositions containing silica have problems in that, in general, these compositions exhibit poor processability and, in particular, compositions containing natural rubber exhibit poor processability such as poor dispersion of silica and poor shrinkage of the obtained compounds. Therefore, sufficient physical properties cannot be obtained.

It has been difficult that excellent physical properties such as excellent abrasion resistance and low hysteresis loss property (low heat build-up property) are obtained by using rubber compositions containing carbon black or silica in combination with conventional natural rubber since dispersion of these fillers into natural rubber is poor.

DISCLOSURE OF THE INVENTION

Under the above circumstance, the present invention has an object of providing a natural rubber exhibiting improved processability without adverse effects on the properties proper to natural rubber and a process for producing the natural rubber. The present invention has another object of providing a rubber composition and, in particular, a tire case member, a tire tread member and a pneumatic tire using the natural rubber.

As the result of intensive studies by the present inventors to achieve the above objects, it was found that a natural rubber obtained by partially decomposing proteins contained in the non-rubber components of the natural rubber latex within a specific range was effective for overcoming the problems. The present invention has been completed based on this knowledge.

The present invention provides:

1. A natural rubber which is obtained by a deproteinizing treatment of a natural rubber latex and has a total nitrogen content adjusted in a range of 0.12 to 0.30% by weight;
2. A natural rubber described in 1, which is obtained by coagulating the natural rubber latex obtained after the deproteinizing treatment without separation of non-rubber components by centrifugation and drying a product of the coagulation;
3. A natural rubber described in any one of 1 and 2, which has a Mooney viscosity ($ML_{1+4}$) and a stress relaxation time ($T_{80}$) satisfying following equations I and II:

$$40 \leq ML_{1+4} \leq 100 \qquad \text{I}$$

$$T_{80} < 0.0035 \exp(ML_{1+4}/8.2) + 20 \qquad \text{II}$$

wherein $ML_{1+4}$ is a Mooney viscosity measured at 100° C. and $T_{80}$ is a period of time (second) from a time immediately after the measurement of $ML_{1+4}$ when rotation of a rotor is stopped to a time when $ML_{1+4}$ has decreased by 80%;
4. A rubber composition which comprises a natural rubber described in any one of 1 to 3 and a filler;
5. A rubber composition described in 4, which comprises as the filler 20 to 100 parts by weight of carbon black having a specific surface area by nitrogen adsorption of 80 $m^2/g$ or greater or a DBP absorption of 110 ml/100 g or smaller per 100 parts by weight of a rubber component comprising the natural rubber;

6. A rubber composition described in 4, which comprises as the filler 20 to 80 parts by weight of silica per 100 parts by weight of a rubber component comprising the natural rubber;
7. A rubber composition described in any one of 4 to 6, which comprises 5% by weight or more of the natural rubber based on an entire amount of a rubber component;
8. A process for producing a natural rubber which comprises partially deproteinizing a natural rubber latex in a step of deproteinizing the natural rubber latex so that a total nitrogen content in a solid component is adjusted in a range of 0.12 to 0.30, coagulating an obtained natural rubber latex without separation of non-rubber components and drying a product of the coagulation;
9. A rubber composition for tire case members which comprises a natural rubber described in any one of 1 to 3;
10. A rubber composition for tire case members described in 9, wherein the tire case member is an inner member of a tire;
11. A tire case member which is obtained by using a rubber composition described in any one of 9 and 10;
12. A tire case member described in 11, wherein the rubber composition is used as a skim stock for a belt or a carcass;
13. A rubber composition for tire treads which comprises a rubber component comprising a natural rubber described in any one of 1 to 3 and a filler;
14. A rubber composition for tire treads described in 13, wherein the filler is at least one filler selected from carbon black and silica;
15. A tire tread which uses a rubber composition described in any one of 7, 13 and 14;
16. A pneumatic tire which uses a rubber composition described in 5 or 6 for a constituting member of the tire; and
17. A pneumatic tire which comprises a tire case member and/or a tire tread described in any one of 11, 12 and 15.

THE MOST PREFERRED EMBODIMENT TO CARRY OUT THE INVENTION

The natural rubber of the present invention is obtained by adjusting the total nitrogen content in the range of 0.12 to 0.30% by weight by the deproteinization of a natural rubber latex. The natural rubber latex used as the raw material is not particularly limited and field latices and commercial latices can be used.

In the present invention, the deproteinization of the natural rubber latex can be conducted in accordance with a conventional process. Examples of the process include the process of decomposition with an enzyme, the process of repeated cleaning with a surfactant, the process using a combination of an enzyme and a surfactant, the process of transesterification using sodium methoxide and the process of saponification using sodium hydroxide or potassium hydroxide.

As the enzyme, protease, peptidase, cellulase, pectinase, lipase, esterase and amylase can be used singly or in combination. It is suitable that the activity of the enzyme is in the range of 0.1 to 50 APU/g.

It is suitable that the deproteinization enzyme is used in an amount in the range of 0.005 to 0.5 parts by weight and preferably in the range of 0.01 to 0.2 parts by weight per 100 parts by weight of the solid components in the natural rubber latex. When the amount of the deproteinization enzyme is smaller than the above range, there is the possibility that the decomposition reaction of the proteins is insufficient and such an amount is not preferable. When the deproteinization enzyme is added in an amount exceeding the above range, the deproteinization proceeds excessively and the desired balance between the processability and the physical properties cannot be achieved.

In the present invention, a surfactant may be added in combination with the deproteinization enzyme in the deproteinizing treatment. As the surfactant, any of anionic surfactants, cationic surfactants, nonionic surfactants and amphoteric surfactants may be added.

In the present invention, it is necessary that the total nitrogen content in the solid components of the latex be adjusted in the range of 0.12 to 0.30% by weight.

The nitrogen is derived from nitrogen in the polypeptide bond. The amount of the polypeptide bond can be quantitatively analyzed by measuring the absorption by the polypeptide bond in proteins at 3280 cm$^{-1}$ in accordance with the infrared spectroscopy. The total nitrogen content of 0.12% by weight means that about 80% of the polypeptide bond is decomposed. The total nitrogen content of 0.30% by weight means that about 20% of the polypeptide bond is decomposed.

In the present invention, when the total nitrogen content is smaller than 0.12% by weight, the effect of improving the mechanical properties (in particular, the tensile properties) and the low heat build-up property cannot be obtained and there is the possibility that aging resistance deteriorates. The effect of improving the tensile properties and the low heat build-up property of a rubber composition can be obtained only when the total nitrogen content is within the specific range of 0.12% or greater. This effect is considered to be obtained since the dispersion of fine particle of carbon black into the rubber is improved due to the decrease in viscosity of the rubber to a suitable degree by the decomposition of the polypeptide bond and the interaction between the filler and the rubber increases due to the improved dispersion.

On the other hand, the processability becomes poor when the total nitrogen content exceeds 0.30% by weight. From the above standpoint, it is preferable that the total nitrogen content is in the range of 0.12 to 0.30% by weight and more preferably in the range of 0.18 to 0.25% by weight. When the above range is expressed by the degree of decomposition of the polypeptide bond, it is preferable that the degree of decomposition of the polypeptide bond is in the range of 20 to 80% and more preferably in the range of 30 to 70%.

It is preferable that the natural rubber latex deproteinized as described above is coagulated without separation of non-rubber components. When the non-rubber components are separated, the aging resistance is occasionally poor.

In the process for producing natural rubber of the present invention, it is preferable that a natural rubber latex is partially deproteinized in a step of deproteinizing the natural rubber latex so that the total nitrogen content in the solid component is adjusted in the range of 0.12 to 0.30, the obtained natural rubber latex is coagulated without separation of non-rubber components and the product of the coagulation is dried.

The rubber component obtained by coagulating the deproteinized latex is cleaned and, then, dried by a conventional drier such as a vacuum drier, an air drier and a drum drier and the natural rubber of the present invention can be obtained.

For improving the processability of the rubber, the relaxation time of an input force may be decreased. In the above natural rubber of the present invention, branch points are selectively broken by the partial deproteinization and the stress relaxation time is decreased. Therefore, the excellent processability (the shrinking property and the stability in the shape) can be obtained. In the present invention, the stress relaxation time is decided by the relation with the value of $ML_{1+4}$ at the time of measurement of the Mooney viscosity and it is referable that both of the following equations I and II are satisfied:

$$40 \leq ML_{1+4} \leq 100 \quad \text{I}$$

$$T_{80} < 0.0035 \exp(ML_{1+4}/8.2) + 20 \quad \text{II}$$

wherein $ML_{1+4}$ is the Mooney viscosity measured at 100° C. and $T_{80}$ is the period of time (second) from the time immediately after the measurement of $ML_{1+4}$ when rotation of the rotor is stopped to the time when $ML_{1+4}$ has decreased by 80%.

The effect of retaining the viscosity can be further improved by adding a hydrazide compound to the natural rubber of the present invention.

In the rubber composition of the present invention, it is preferable that the above specific natural rubber is comprised in an amount of at least 5% by weight of the rubber component. When this amount is less than 5% by weight, a rubber composition having the desired physical properties cannot be obtained, occasionally. It is more preferable that the above specific natural rubber is comprised in an amount of 10% by weight or more of the rubber component.

Examples of the rubber component used in combination with the specific natural rubber described above include conventional natural rubber and diene-based synthetic rubbers. Examples of the diene-based synthetic rubber include styrene-butadiene copolymers (SBR), polybutadiene (BR), polyisoprene (IR), butyl rubber (IIR), ethylene-propylene copolymers and mixtures of these rubbers.

It is preferable that the rubber composition of the present invention comprises the natural rubber described above and a filler. The filler is not particularly limited and fillers conventionally used in the rubber industry such as carbon black, silica, alumina, aluminum hydroxide, clay and calcium carbonate can be used.

When carbon black is used as the filler in the rubber composition of the present invention, it is preferable that carbon black having a specific surface area by nitrogen adsorption ($N_2SA$) of 80 $m^2/g$ or greater or a DBP absorption (the amount of absorption of n-dibutyl phthalate) of 110 ml/100 g or smaller is used in an amount of 20 to 100 parts by weight per 100 parts by weight of the rubber component including the natural rubber described above. It is more preferable that carbon black has a specific surface area by nitrogen adsorption of 100 $m^2/g$ or greater or a DBP absorption of 90 ml/100 g or smaller.

When the natural rubber of the present invention obtained by the partial deproteinization is used, the physical properties such as the abrasion resistance and the low hysteresis loss property (the low heat build-up property) of the rubber composition can be remarkably improved since the dispersion of carbon black is improved in comparison with the dispersion obtained by the use of conventional natural rubber even when carbon black having a very small particle diameter, which has a specific surface area by nitrogen adsorption of 80 $m^2/g$ or greater, or carbon black having a low structure, which has a DBP absorption of 100 ml/100 g or smaller, is used.

The carbon black is not particularly limited and a suitable carbon black can be selected as desired from carbon blacks conventionally used as the reinforcing filler for rubber. Examples of the carbon black include FEF, SRF, HAF, ISAF and SAF. From the standpoint of the abrasion resistance, HAF, ISAF and SAF are preferable.

When silica is used as the filler in the rubber composition of the present invention, it is preferable that silica is used in an amount of 20 to 80 parts by weight per 100 parts by weight of the rubber component. When silica is used in combination with the natural rubber of the present invention obtained by the partial deproteinization, the dispersion of silica and the shrinkage of the compound can be remarkably improved in comparison with those obtained by the use of conventional natural rubber and the physical properties such as the abrasion resistance and the low hysteresis loss property can be remarkably improved.

The silica is not particularly limited. Wet-process silica, dry-process silica and colloidal silica are preferable. The filler may be used singly or in combination of two or more.

Where desired, the rubber composition of the present invention may further comprise various chemicals conventionally used in the rubber industry such as vulcanizing agents, vulcanization accelerators, process oils, antioxidants, scorch retarders, zinc oxide and stearic acid as long as the objects of the present invention are not adversely affected.

The rubber composition of the present invention can be particularly advantageously applied to rubber for tires. The rubber composition can be applied to any desired tire members such as the tread rubber (including the cap tread rubber and the base tread rubber), the sidewall, the ply skim compound and the bead filler.

Among the tire members, the rubber composition can be particularly advantageously applied to the tire case members and the tire tread. The tire case member include all rubber members excluding the tread rubber. The application to the inner members of the tire is more preferable. Examples of the inner member of the tire include the belt skim compound, the carcass ply skim compound, the squeegee rubber between plies, the cushion rubber between the tread and the belt and the bead filler.

In the natural rubber of the present invention, entanglements between the molecules of the natural rubber are decreased due to decomposition of the peptide bonds in the proteins to a suitable degree. Stress in the rubber is more easily relaxed and, as the result, the rubber composition exhibits excellent resistance to cut growth. The adhesive property is also improved since proteins adversely affecting adhesion are removed. Moreover, as the result of the decrease in viscosity of the rubber to a suitable degree, the dispersion of the filler composed of fine particles is improved and the mechanical properties and the low hysteresis loss property are improved. Since the dispersion of the filler is remarkably improved, the abrasion resistance is improved.

Therefore, when the rubber composition of the present invention is applied to a tire case member such as the skim rubber for the belt and the carcass ply, the resistance to cord separation, the adhesion between the rubber and the cord and the mechanical properties (such as the retention of the elongation at break) of the rubber in the tire after being driven on the roads are remarkably improved.

When the rubber composition of the present invention is applied to the tire tread, the abrasion resistance, the low hysteresis loss property and the tear resistance are remarkably improved.

The natural rubber and the rubber composition of the present invention can also be used for applications other than the tires such as vibration isolation rubbers, belts, hoses and other industrial rubber products.

EXAMPLES

The present invention will be described more specifically with reference to examples in the following. However, the present invention is not limited to the examples.

In Examples and Comparative Examples in the following, the total nitrogen content, the Mooney viscosity and the stress relaxation time of a natural rubber and various physical properties of a vulcanized rubber were measured in accordance with the following methods.

(1) Measurement of the Total Nitrogen Content

The total nitrogen content was measured in accordance with the Kjeldahl method and expressed as the fraction based on the entire amount (% by weight).

(2) Mooney Viscosity and Stress Relaxation Time of Natural Rubber

The Mooney viscosity was measured in accordance with the method of Japanese Industrial Standard K6300-1994 at 100° C. [$ML_{1+4}$/100° C.].

The stress relaxation time ($T_{80}$) was measured as the period of time (second) from the time immediately after the measurement of $ML_{1+4}$ when rotation of the rotor is stopped to the time when $ML_{1+4}$ has decreased by 80%.

(3) Mooney Viscosity of a Compound (a Rubber Composition)

The Mooney viscosity of a compound was measured in accordance with the method of Japanese Industrial Standard K6300-1994 at 130° C. [$ML_{1+4}$/130° C.]. The smaller the obtained value, the more excellent the processability.

(4) Physical Properties of a Vulcanized Rubber Composition (a) Tensile Strength

The strength at break (Tb) was measured in accordance with the method of Japanese Industrial Standard K6301-1995.

(b) tan δ (Dynamic Loss)

Using an apparatus for measuring the viscoelasticity (manufactured by RHEOMETRICS Corp.), tan δ (50° C.) was measured at a temperature of 50° C., a strain of 5% and a frequency of 15 Hz. The smaller the tan δ (50° C.), the smaller the heat build-up.

(c) Aging Resistance (Index)

The tensile strength obtained after heat aging at 100° C. for 72 hours was divided by the tensile strength before the heat aging and the result is expressed as the percentage. The greater the obtained value, the more excellent the aging resistance.

(d) Abrasion Resistance (Index)

Using an abrasion tester of the Lambourn type, the amount of abrasion was measured at the room temperature at a slipping ratio of 60% and is expressed as the index. The greater the index, the more excellent the abrasion resistance.

Examples 1 to 4 and Comparative Examples 1 to 5

<Process for Producing Natural Rubbers>

Preparation Example 1

(1) Step of Decomposition of the Peptide Bond in a Natural Rubber Latex

An anionic surfactant [manufactured by KAO Co., Ltd.; "DEMOL"; the concentration of the surfactant: 2.5% by weight] in an amount of 24.7 ml and 0.06 g of protease (manufactured by NOVOZAIMS; "ALKALASE 2.5L, TYPE DX") were added into and mixed with 136 g of water and a solution was prepared.

Then, while 1,000 g of a natural rubber latex having a content of solid components of 20% by weight was kept at a temperature of 40° C. in a water bath and stirred, the solution prepared in (1) was added dropwise to the natural rubber latex. The resultant mixture was kept being stirred for 5 hours at the same temperature and natural rubber latex (A) was obtained.

(2) Step of Coagulation and Drying

The rubber component was coagulated from natural rubber latex (A) with an acid. The coagulated rubber component was passed through a drum drier set at 130° C. 5 times and, then, dried in a vacuum drier at 40° C. for 8 hours and natural rubber (a) was prepared.

Preparation Example 2 and 3

In accordance with the same procedures as those conducted in Preparation Example 1 except that, in place of protease used in Preparation Example 1, peptidase (manufactured by MANPO TSUSHO; "DEBITORASE") was used in Preparation Example 2 and sodium hydroxide was used in Preparation Example 3, natural rubber latices (B) and (C), respectively, were obtained and natural rubbers (b) and (c), respectively, were prepared after coagulation with an acid and drying.

Preparation Example 4

In accordance with the same procedures as those conducted in Preparation Example 1 except that the amount of the added protease and the time of stirring with the natural rubber latex were changed as shown in Table 1, natural rubber latex (D) was obtained and natural rubber (d) was produced after coagulation with an acid and drying.

Preparation Example 5

In accordance with the same procedures as those conducted in Preparation Example 1 except that the amount of the added protease was 0.04 g, natural rubber latex (E) was obtained. Natural rubber latex (E) was treated by centrifugation using a latex separator SLP-3000 (manufactured by SAITO ENSHINKI KOGYO) at a rotation speed of 7,500 rpm and natural rubber (e) was prepared after the steps of coagulation with an acid and drying.

Preparation Example 6

In accordance with the same procedures as those conducted in Preparation Example 1 except that the amount of the added protease and the time of stirring with the natural rubber latex were changed as shown in Table 1, natural rubber latex (F) was obtained and natural rubber (f) was prepared after coagulation with an acid and drying.

Preparation Example 7

In accordance with the same procedures as those conducted in Preparation Example 1 except that the step of decomposition of the peptide bond was not conducted, natural rubber (g) was prepared after coagulation with an acid and drying.

The total nitrogen content in the rubber, the Mooney viscosity ($ML_{1+4}$, 100° C.) and the stress relaxation time of natural rubbers (a) to (g) obtained in Preparation Examples 1 to 7, respectively, were measured. The results are shown in Table 1.

TABLE 1 - 1

| | Prepared natural rubber | | |
|---|---|---|---|
| | a | b | c |
| | (Preparation Example) | | |
| | (1) | (2) | (3) |
| Conditions of deproteinization enzyme | | | |
| type | protease | peptidase | — |
| amount | 0.06 g | 0.06 g | — |
| alkali | | | |
| type | — | — | NaOH |
| amount | — | — | 0.06 g |
| time of treatment | 5 hr | 5 hr | 5 hr |
| Centrifugation after deproteinization | none | none | none |
| Mooney viscosity (ML1 + 4, 100° C.) | 65 | 66 | 64 |
| Stress relaxation time ($T_{80}$, sec) | 25.5 | 29.0 | 24.5 |
| Total nitrogen content (%) | 0.16 | 0.19 | 0.18 |

TABLE 1 - 2

| | Prepared natural rubber | | | |
|---|---|---|---|---|
| | d | e | f | g |
| | (Preparation Example) | | | |
| | (4) | (5) | (6) | (7) |
| Conditions of deproteinization enzyme | | | | |
| type | protease | protease | protease | — |
| amount | 0.9 g | 0.04 g | 0.03 g | — |
| alkali | | | | |
| type | — | — | — | — |
| amount | — | — | — | — |
| time of treatment | 8 hr | 5 hr | 2 hr | — |
| Centrifugation after deproteinization | none | conducted | none | none |
| Mooney viscosity (ML1 + 4, 100° C.) | 52 | 67 | 71 | 73 |
| Stress relaxation time ($T_{80}$, sec) | 16.0 | 31.0 | 46.0 | 62.5 |
| Total nitrogen content (%) | 0.055 | 0.17 | 0.36 | 0.47 |

Using the various types of prepared natural rubbers obtained in Preparation Examples 1 to 7 which are shown in Table 1, rubber compositions were prepared by mixing the components in accordance with the conventional process in accordance with the formulation shown in Table 2.

TABLE 2

| Formulation | Part by weight |
|---|---|
| Natural rubber | 100 |
| Carbon black N339 *0 | 50 |
| Aromatic oil | 5 |
| Stearic acid | 2 |
| Antioxidant 6C *1 | 1 |
| Zinc oxide | 3 |
| Vulcanization accelerator DZ *2 | 0.8 |
| Sulfur | 1 |

*0 Carbon black N339: manufactured by TOKAI CARBON Co., Ltd.; "SEAST KH" (a trade name); $N_2SA$: 92; DBP absorption: 120
*1 Antioxidant 6C: N-phenyl-N-1,3-dimethylbutyl-p-phenylenediamine
*2 Vulcanization accelerator DZ: N,N-dicyclohexyl-2-benzothiazolyl- sulfenamide The Mooney viscosity ($ML_{1+4}$, 130° C.) of the prepared rubber compositions was measured. The rubber compositions were vulcanized under the condition of 145° C. and 33 minutes and the physical properties of the vulcanized rubber compositions were measured. The results are shown in Table 3.

TABLE 3 - 1

| | Evaluation of rubber composition | | | |
|---|---|---|---|---|
| | Example | | | Comparative Example |
| | 1 | 2 | 3 | 1 |
| Prepared natural rubber | | | | |
| type | a | b | c | d |
| amount (part by weight) | 100 | 100 | 100 | 100 |
| IR2200 (part by weight) | 0 | 0 | 0 | 0 |
| Mooney viscosity (ML1 + 4, 130° C.) | 65 | 66 | 66 | 61 |
| Tensile strength Tb (MPa) | 27.4 | 27.2 | 26.7 | 23.9 |
| tan δ | 0.162 | 0.164 | 0.163 | 0.196 |
| Resistance to heat aging (index) | 52 | 51 | 48 | 43 |

TABLE 3 - 2

| | Evaluation of rubber composition | | | | |
|---|---|---|---|---|---|
| | Example | Comparative Example | | | |
| | 4 | 2 | 3 | 4 | 5 |
| Prepared natural rubber | | | | | |
| type | e | f | g | g (masticated) | g |
| amount (part by weight) | 100 | 100 | 100 | 100 | 75 |
| IR2200 (part by weight) | 0 | 0 | 0 | 0 | 25 |
| Mooney viscosity (ML1 + 4, 130° C.) | 66 | 75 | 76 | 69 | 73 |
| Tensile strength Tb (MPa) | 26.9 | 26.4 | 26.2 | 26.6 | 25.3 |
| tan δ | 0.161 | 0.174 | 0.176 | 0.171 | 0.182 |
| Resistance to heat aging (index) | 37 | 49 | 48 | 47 | 37 |

In the results shown above, the natural rubbers in Examples 1 to 4 had the total nitrogen contents after the deproteinization in the range of 0.12 to 0.30% by weight which is specified in the present invention and both of the tensile strength and the low hysteresis loss property (tan δ) of the vulcanized rubber compositions were more excellent than those in Comparative Examples 1 to 5. In particular, the aging resistance was remarkably more excellent in Examples 1 to 3 in which the natural rubbers obtained without centrifugation after the deproteinization were used.

In Comparative Example 1, highly deproteinized natural rubber (d) having a total nitrogen content of 0.015% by weight was used. In Comparative Example 2, natural rubber (f) having a total nitrogen content of 0.36% by weight was used. In Comparative Example 3, natural rubber (g) not treated by the deproteinization was used. In Comparative Example 4, rubber obtained by an enhanced mastication of natural rubber (g) to decrease the Mooney viscosity was used. In Comparative Example 5, a blend of natural rubber (g) with a synthetic polyisoprene (the trade name: "IR2200"; manufactured by JSR Corporation) was used. The effect of the present invention was not obtained in any of the above cases.

Examples 5 to 7 and Comparative Example 6 to 11

Using prepared natural rubbers a, d and g obtained in Preparation Examples 1, 4 and 7, respectively, which are shown in Table 4, rubber compositions were prepared by mixing the components in accordance with the conventional process in accordance with the formulations shown in Table 5.

TABLE 4

|  | Prepared natural rubber | | |
|---|---|---|---|
|  | a | d | g |
|  | (Preparation Example) | | |
|  | (1) | (4) | (7) |
| Conditions of deproteinization | | | |
| enzyme | | | |
| type | protease | protease | — |
| amount | 0.06 g | 0.9 g | — |
| alkali | | | |
| type | — | — | — |
| amount | — | — | — |
| time of treatment | 5 hr | 8 hr | — |
| Centrifugation after deproteinization | none | none | none |
| Mooney viscosity (ML1 + 4, 100° C.) | 65 | 52 | 73 |
| Total nitrogen content (%) | 0.16 | 0.055 | 0.47 |

TABLE 5

|  | Formulation (part by weight) | | |
|---|---|---|---|
|  | 1 | 2 | 3 |
| Natural rubber | 100 | 100 | 100 |
| Carbon black N326 *3 | 50 | | |
| Carbon black N110 *4 | | 50 | |
| Silica *5 | | | 55 |
| Silane coupling agent *6 | | | 5.5 |
| Aromatic oil | 5 | 5 | 10 |
| Stearic acid | 2 | 2 | 2 |
| Antioxidant 6C | 1 | 1 | 1 |
| Zinc oxide | 3 | 3 | 3 |
| Vulcanization accelerator DZ | 0.8 | 0.8 | |
| Vulcanization accelerator DPG *7 | | | 1 |
| Vulcanization accelerator DM *8 | | | 1 |

TABLE 5-continued

|  | Formulation (part by weight) | | |
|---|---|---|---|
|  | 1 | 2 | 3 |
| Vulcanization accelerator NS *9 | | | 1 |
| Sulfur | 1 | 1 | 1.5 |

*3 Carbon black N326: manufactured by TOKAI CARBON Co., Ltd.; "SEAST 300" (a trade name); N$_2$SA: 75; DBP absorption: 84
*4 Carbon black N110: manufactured by TOKAI CARBON Co., Ltd.; "SEAST 9" (a trade name); N$_2$SA: 130; DBP absorption: 113
*5 Silica: manufactured by NIPPON SILICA KOGYO Co., Ltd.; "NIPSIL AQ"
*6 Silane coupling agent: manufactured by DEGUSSA AG.; "Si69"
*7 Vulcanization accelerator DPG: diphenylguanidine
*8 Vulcanization accelerator DM: dibenzothiazyl disulfide
*9 Vulcanization accelerator NS: N-t-butyl-2-benzothiazolylsulfenamide The Mooney viscosity ($ML_{1+4}$, 130° C.) of the prepared rubber compositions was measured. The rubber compositions were vulcanized under the condition of 145° C. and 33 minutes and the physical properties of the vulcanized rubber compositions were measured. The results are shown in Table 6.

TABLE 6 - 1

| Evaluation of rubber composition (Formulation 1) | | | |
|---|---|---|---|
|  | Example | Comparative Example | |
|  | 5 | 6 | 7 |
| Prepared natural rubber | | | |
| type | a | d | g |
| total nitrogen content (%) | 0.16 | 0.055 | 0.47 |
| Compound Mooney viscosity (ML1 + 4, 130° C.) | 45 | 42 | 61 |
| Tensile strength Tb (MPa) | 26.7 | 22.4 | 24.9 |
| tan δ | 0.120 | 0.168 | 0.150 |
| Abrasion resistance (index) | 112 | 95 | 100 |

TABLE 6 - 2

| Evaluation of rubber composition (Formulation 2) | | | |
|---|---|---|---|
|  | Example | Comparative Example | |
|  | 6 | 8 | 9 |
| Prepared natural rubber | | | |
| type | a | d | g |
| total nitrogen content (%) | 0.16 | 0.055 | 0.47 |
| Compound Mooney viscosity (ML1 + 4, 130° C.) | 75 | 68 | 95 |
| Tensile strength Tb (MPa) | 29.1 | 25.5 | 27.5 |
| tan δ | 0.187 | 0.259 | 0.246 |
| Abrasion resistance (index) | 116 | 94 | 100 |

TABLE 6 - 3

| Evaluation of rubber composition (Formulation 3) | | | |
|---|---|---|---|
|  | Example | Comparative Example | |
|  | 7 | 10 | 11 |
| Prepared natural rubber | | | |
| type | a | d | g |
| total nitrogen content (%) | 0.16 | 0.055 | 0.47 |

TABLE 6 - 3-continued

Evaluation of rubber composition (Formulation 3)

| | Example | Comparative Example | |
|---|---|---|---|
| | 7 | 10 | 11 |
| Compound Mooney viscosity (ML1 + 4, 130° C.) | 74 | 66 | 91 |
| Tensile strength Tb (MPa) | 25.5 | 22.8 | 23.6 |
| tan δ | 0.110 | 0.139 | 0.132 |
| Abrasion resistance (index) | 113 | 96 | 100 |

As shown by the results in the above, the low hysteresis loss property and the abrasion resistance in Examples 5 to 7 were both remarkably more excellent that those in Comparative Examples.

Examples 8 to 10 and Comparative Examples 12 and 13

Tires were prepared by using the prepared natural rubbers for the tire case members and the test of the tire performance was conducted.

<Test of the Tire Performance>

Using test tires of the size of 185/70R14, the durability of the tires was evaluated in accordance with the following method.

Twenty tires of the above size were prepared for each natural rubber. After the tires were driven on the roads for 80,000 km, the tires were recovered and evaluated. The average value obtained from the 20 tires was used as the value of the evaluation.

(a) Resistance to Belt Edge Separation

Cut samples containing the belt layer were prepared from two portions on the circumference of each recovered tire and the lengths of cracks at the belt edge (at the serial side and at the opposite side) were measured. The result is expressed as an index using the result of Comparative Example 13 as the reference which is set at 100. The greater the index, the more excellent the resistance to belt edge separation.

(b) Adhesion of Rubber and Steel Cord (After Driving)

Samples containing the belt layer were taken from the recovered tires. In the peeling test, the steel cord in the belt layer was pulled at a speed of 50 mm/min and the condition of adhesion of the rubber to the exposed surface of the steel cord was evaluated by the visual observation. The result was evaluated in accordance with the following criterion:

Rank A: The fraction having adhered rubber: 80 to 100%

Rank B: The fraction having adhered rubber: 60 to 80%

(c) Retention of Elongation at Break of Rubber

Samples having a thickness of 0.5 mm were cut out from the belt skim rubber in the tires before the driving and in the recovered tires in accordance with the method of Japanese Industrial Standard K 6251 and test pieces having the shape of a dumbbell were prepared. The samples were used for the test in accordance with the method of Japanese Industrial Standard K 6301 and the retention of elongation at break was calculated in accordance with the following equation. The greater the value, the more excellent the durability to heat aging.

Retention of elongation at break (%) =[(elongation at break of belt skim rubber after driving)/ (elongation at break of belt skim rubber before driving)]×100

<Process for Producing Natural Rubber>

Preparation Example 8

(1) Step of Decomposition of the Peptide Bond in Natural Rubber Latex

An anionic surfactant [manufactured by KAO Co., Ltd.; DEMOL; the concentration of the surfactant: 2.5% by weight] in an amount of 24.7 ml and 0.06 g of protease (manufactured by NOVOZAIMS; "ALKALASE 2.5L, TYPE DX") were added into and mixed with 136 g of water and a solution was prepared.

Then, while 1,000 g of a natural rubber latex having a content of solid components of 20% by weight was kept at a temperature of 40° C. in a water bath and stirred, the solution prepared in (1) was added dropwise to the natural rubber latex. The resultant mixture was kept being stirred for 5 hours at the same temperature and natural rubber latex (H) was obtained.

(2) Step of Coagulation and Drying

The rubber component was coagulated from natural rubber latex (A) with an acid. The coagulated rubber component was passed through a drum drier set at 130° C. 5 times and then dried in a vacuum drier at 40° C. for 8 hours and natural rubber (h) was prepared.

Preparation Example 9

In accordance with the same procedures as those conducted in Preparation Example 8 except that, peptidase (manufactured by MANPO TSUSHO; "DEBITORASE") was used in place of protease used in Preparation Example 8, natural rubber latex (I) was obtained and natural rubber (i) was produced after coagulation with an acid and drying.

Preparation Example 10

In accordance with the same procedures as those conducted in Preparation Example 8 except that the amount of the added protease and the time of stirring with the natural rubber latex were changed as shown in Table 7, natural rubber latex (J) was obtained and natural rubber (j) was produced after coagulation with an acid and drying.

Preparation Example 11

In accordance with the same procedures as those conducted in Preparation Example 8, natural rubber latex (H') after the step of decomposition of the peptide bond in natural rubber latex was obtained. Natural rubber latex (H') was treated by centrifugation using a latex separator SLP-3000 (manufactured by SAITO ENSHINKI KOGYO) at a rotation speed of 7,500 rpm and natural rubber (k) was produced after the steps of coagulation with an acid and drying.

Preparation Example 12

In accordance with the same procedures as those conducted in Preparation Example 8 except that the step of decomposition of the peptide bond was not conducted, natural rubber (L) was prepared after coagulation with an acid and drying.

The total nitrogen content in the solid components in the latices immediately before the coagulation and the Mooney viscosity ($ML_{1+4}$, 100° C.) of natural rubbers (h) to (L) obtained in Preparation Examples 8 to 12, respectively, were measured. The results are shown in Table 7.

TABLE 7

| | Prepared natural rubber | | | | |
|---|---|---|---|---|---|
| | h | i | j | k | L |
| | Preparation Example | | | | |
| | 8 | 9 | 10 | 11 | 12 |
| Enzyme of deproteinization | | | | | |
| type | protease | peptidase | protease | protease | — |
| amount | 0.06 g | 0.06 g | 0.9 g | 0.04 g | — |
| Time of deproteinization | 5 hr | 5 hr | 8 hr | 5 hr | — |
| Centrifugation after deproteinization | none | none | none | conducted | none |
| Mooney viscosity (ML1 + 4, 100° C.) | 65 | 66 | 52 | 67 | 73 |
| Total nitrogen content (%) | 0.16 | 0.19 | 0.055 | 0.17 | 0.47 |

Using prepared natural rubbers (h) to (L) obtained in Preparation Examples 8 to 12, respectively, which are shown in Table 7, rubber compositions were prepared by mixing the components in accordance with the conventional process in accordance with the formulations shown in Table 8.

TABLE 8

| Formulation | Part by weight |
|---|---|
| Natural rubber | 100 |
| Carbon black *10 | 60 |
| Antioxidant 6C | 1 |
| MANOBOND C | 1 |
| Zinc oxide | 5 |
| Vulcanization accelerator DZ | 1 |
| Sulfur | 6 |

*10 Carbon black: manufactured by TOKAI CARBON Co., Ltd.; "SEAST 3" (a trade name); $N_2SA$: 79; DBP absorption: 102

Using the rubber compositions prepared above as the skim stock of the steel cord carcass ply, tires of the size of 185/70R14 were prepared and the test of the tire performance was conducted in accordance with the methods described above. Using the tires after driving, the resistance to belt edge separation, the adhesion of rubber and steel cord and the retention of elongation at break of rubber were evaluated. The results are shown in Table 9.

TABLE 9

| | Evaluation of tire case member | | | | |
|---|---|---|---|---|---|
| | Example | Comparative Example | Example | Comparative Example | |
| | 8 | 9 | 12 | 10 | 13 |
| Natural rubber obtained in Preparation example | h | i | j | k | L |
| Resistance to belt edge separation (index) | 116 | 114 | 102 | 109 | 100 |
| Adhesion of rubber and steel after driving | A | A | B | B | B |
| Retention of elongation at break of rubber (%) | 65 | 63 | 53 | 45 | 59 |

In the above, the rubber compositions used for the tires of Examples 8 to 10 contained the natural rubbers having a total nitrogen content after the deproteinization in the range of 0.12 to 0.30% by weight which is specified in the present invention. It is shown that these tires exhibited more excellent resistance to belt edge separation after driving than that of the tires of Comparative Examples 12 and 13. In particular, the tires in Examples 8 and 9 in which the natural rubbers obtained without centrifugation after the deproteinization were used exhibited remarkably more excellent adhesion of rubber and steel cord and retention of elongation at break of rubber.

Highly deproteinized natural rubber (j) having the total nitrogen content of 0.055% by weight was used in the tires in Comparative Example 12 and natural rubber (L) obtained without the deproteinizing treatment was used in the tires in Comparative Example 13. The effect of the present invention was not obtained in either case.

Examples 11 to 13 and Comparative Example 14 and 15

Using the prepared natural rubbers for the tire tread, tires were prepared and the performance of the prepared tires was evaluated.

<Test of the Tire Performance>

Using the various prepared natural rubbers for the tread, heavy duty tires of the size of 11R22.5 were prepared and the abrasion resistance, the low rolling resistance property and the tear resistance were evaluated in accordance with the following method.

(d) Abrasion Resistance

After the tires were attached to a vehicle and driven on the roads for 50,000 km, the driving distance per 1 mm of abrasion was calculated from the residual depth of the groove in the tread portion. The result is expressed as an index using the result of Comparative Example 15 as the reference which is set at 100. The greater the index, the more excellent the abrasion resistance.

(e) Low Rolling Resistance Property

The tire prepared above was driven on a drum at a speed of 80 km/hour and the rolling resistance was measured. The result is expressed as an index using the result of Comparative Example 15 as the reference which is set at 100. The greater the index, the more excellent the low rolling resistance property.

(f) Tear Resistance

In the tires after being used for the evaluation of the abrasion resistance in the above, cracks formed at the bottom of grooves of blocks were visually observed and the tear resistance was evaluated in accordance with the following criteria:

excellent: no cracks found by visual observation
fair: minute cracks found, but no growth of the cracks found
poor: growth of cracks found, cracks connected to each other Using prepared natural rubbers h to L obtained in Preparation Examples 8 to 12, respectively, which are shown in Table 7, rubber compositions were prepared by mixing the components in accordance with the conventional process in accordance with the formulations shown in Table 10.

TABLE 10

| Formulation | Part by weight |
|---|---|
| Natural rubber | 100 |
| Carbon black ISAF [*11] | 60 |
| Antioxidant 6C | 1 |
| Stearic acid | 2 |
| Zinc oxide | 4 |
| Vulcanization accelerator CZ | 1 |
| Sulfur | 1.5 |

[*11] Carbon black ISAF: $N_2SA$: 115; DBP absorption: 114

Using the rubber compositions prepared above as the tread rubber, tires of the size of 11R22.5 were prepared and the performance of the prepared tires was evaluated in accordance with the methods described above. The abrasion resistance, the low rolling resistance property and the tear resistance were evaluated. The results are shown in Table 11.

TABLE 11

| | Evaluation of tire tread | | | |
|---|---|---|---|---|
| | Example | Comparative Example | Example | Comparative Example |
| | 11 | 12 | 14 | 13 | 15 |
| Natural rubber obtained in Preparation Example | h | i | j | k | L |
| Abrasion resistance (index) | 108 | 107 | 95 | 105 | 100 |
| Low rolling resistance property (index) | 109 | 107 | 96 | 106 | 100 |
| Tear resistance | excellent | excellent | fair | fair | fair |

In the above, the rubber compositions used for the tires of Examples 11 to 13 contained the natural rubbers having a total nitrogen content in the range of 0.12 to 0.30% by weight which is specified in the present invention. It is shown that these tires exhibited more excellent abrasion resistance and low rolling resistance property than those of the tires of Comparative Examples 14 and 15. In particular, the tires in Examples 11 and 12 in which the natural rubbers obtained without centrifugation after the deproteinization were used exhibited remarkably more excellent tear resistance.

Highly deproteinized natural rubber (j) having the total nitrogen content of 0.055% by weight was used in the tires in Comparative Example 14 and natural rubber (L) obtained without the deproteinizing treatment was used in the tires in Comparative Example 15. The effect of the present invention was not obtained in either case.

INDUSTRIAL APPLICABILITY

In accordance with the present invention, natural rubber exhibiting improved processability without adverse effects on the physical properties proper to natural rubber can be obtained. The rubber composition exhibits an improved low hysteresis loss property and improved abrasion resistance and can be advantageously used for various industrial rubber products and, in particular, for pneumatic tires as a tire case member and a tire tread.

The invention claimed is:

1. A natural rubber which is obtained by a deproteinizing treatment of a natural rubber latex and has a total nitrogen content adjusted in a range of 0.12 to 0.30% by weight, and which is obtained by coagulating the natural rubber latex obtained after the deproteinizing treatment without separation of non-rubber components and drying a product of the coagulation.

2. A natural rubber according to claim 1, which has a Mooney viscosity ($ML_{1+4}$) and a stress relaxation time ($T_{80}$) satisfying following equations I and II:

$$40 \leq ML_{1+4} \leq 100 \qquad \text{I}$$

$$T_{80} < 0.0035\exp(ML_{1+4}/8.2)+20 \qquad \text{II}$$

wherein $ML_{1+4}$ is a Mooney viscosity measured at 100° C. and $T_{80}$ is a period of time (second) from a time immediately after the measurement of $ML_{1+4}$ when rotation of a rotor is stopped to a time when $ML_{1+4}$ has decreased by 80%.

3. A rubber composition which comprises a natural rubber described in claim 1 and a filler.

4. A rubber composition according to claim 3, which comprises as the filler 20 to 100 parts by weight of carbon black having a specific surface area by nitrogen adsorption of 80 $m^2/g$ or greater or a DBP absorption of 110 ml/100 g or smaller per 100 parts by weight of a rubber component comprising the natural rubber.

5. A rubber composition according to claim 3, which comprises as the filler 20 to 80 parts by weight of silica per 100 parts by weight of a rubber component comprising the natural rubber.

6. A rubber composition according to any one of claims 3 to 5, which comprises 5% by weight or more of the natural rubber based on an entire amount of a rubber component.

7. A process for producing a natural rubber which comprises partially deproteinizing a natural rubber latex in a step of deproteinizing the natural rubber latex so that a total nitrogen content in a solid component is adjusted in a range of 0.12 to 0.30, coagulating an obtained natural rubber latex without separation of non-rubber components and drying a product of the coagulation.

8. A rubber composition for tire case members which comprises a natural rubber described in claim 1.

9. A rubber composition for tire case members according to claim 8, wherein the tire case member is an inner member of a tire.

10. A tire case member which is obtained by using a rubber composition described in any one of claims 8 and 9.

11. A tire case member according to claim 10, wherein the rubber composition is used as a skim stock for a belt or a carcass.

12. A rubber composition for tire treads which comprises a rubber component comprising a natural rubber described in claim 1 and a filler.

13. A rubber composition for tire treads according to claim 12, wherein the filler is at least one filler selected from carbon black and silica.

14. A tire tread which uses a rubber composition described in claim 6.

15. A pneumatic tire which uses a rubber composition described in claim 4 for a constituting member of the tire.

16. A pneumatic tire which uses a rubber composition described in claim 5 for a constituting member of the tire.

17. A pneumatic tire which comprises a tire case member described in claim 10.

18. A pneumatic tire which comprises a tire tread described in claim 14.

19. A natural rubber according to claim 1, which is obtained by partially deproteinizing treatment of the natural rubber latex.

* * * * *